April 11, 1939.  J. A. SHAFER  2,153,649
CAR TRUCK
Filed Oct. 14, 1937  4 Sheets-Sheet 1

INVENTOR
James A. Shafer
BY
ATTORNEY

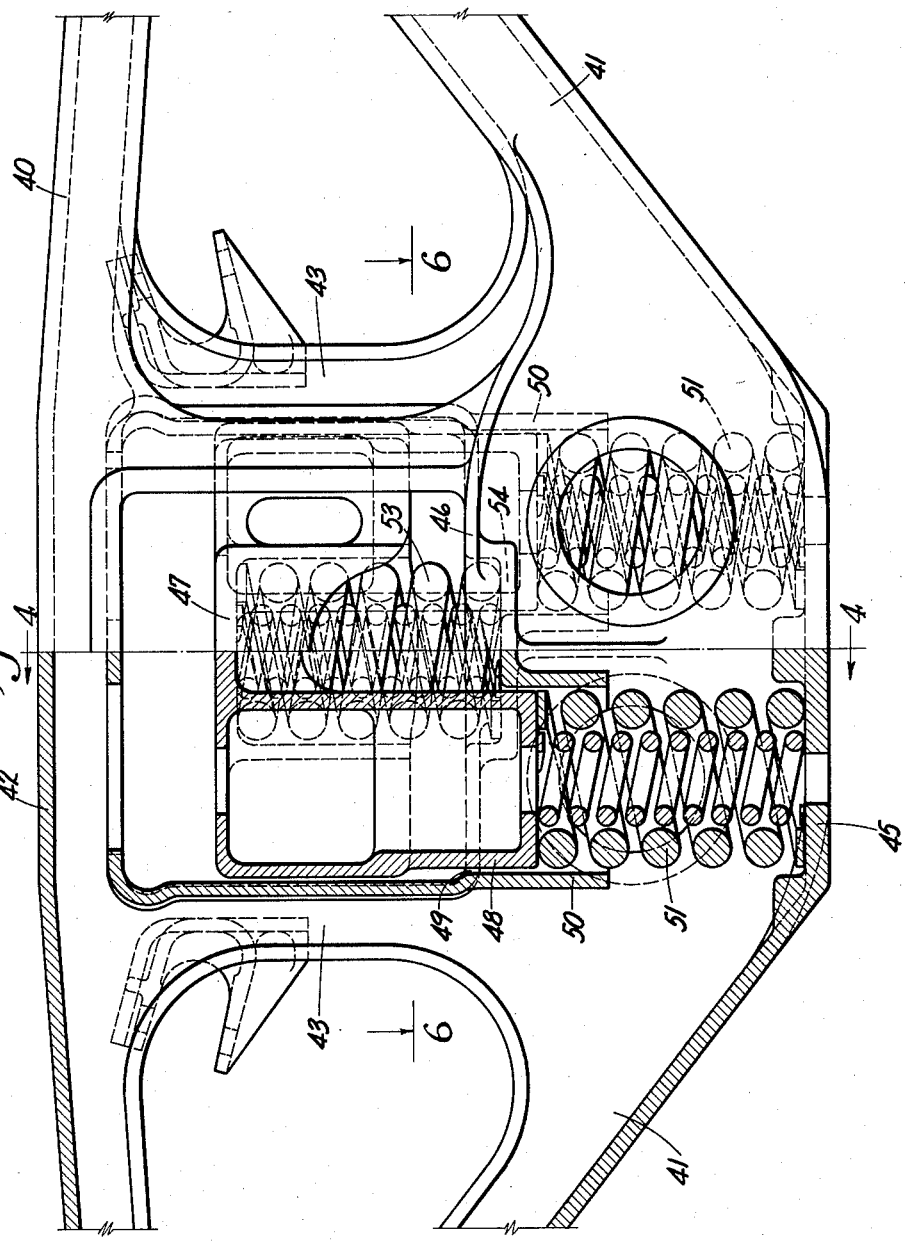

April 11, 1939.  J. A. SHAFER  2,153,649
CAR TRUCK
Filed Oct. 14, 1937   4 Sheets-Sheet 3
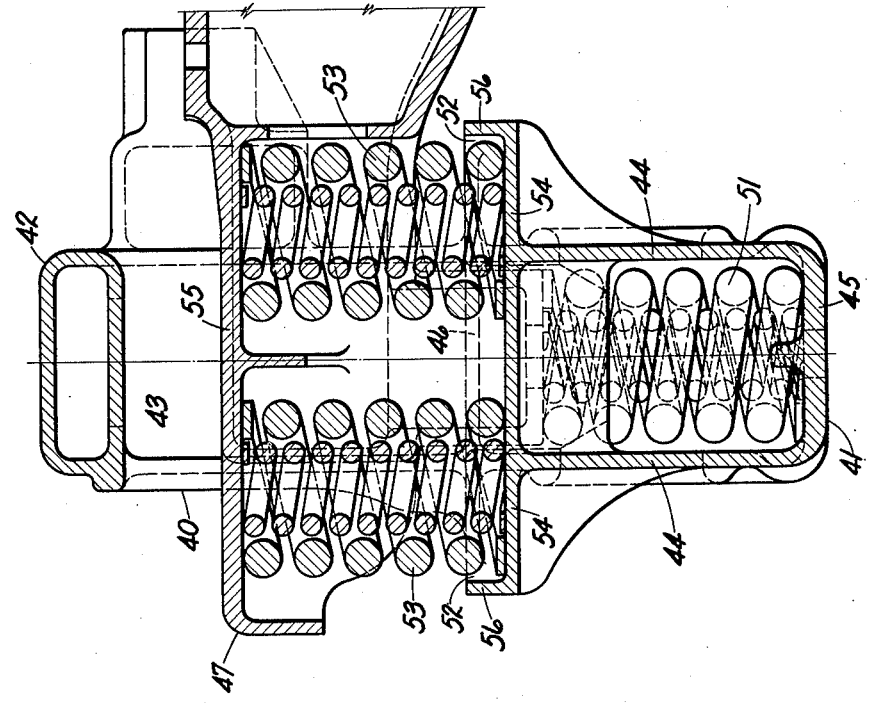
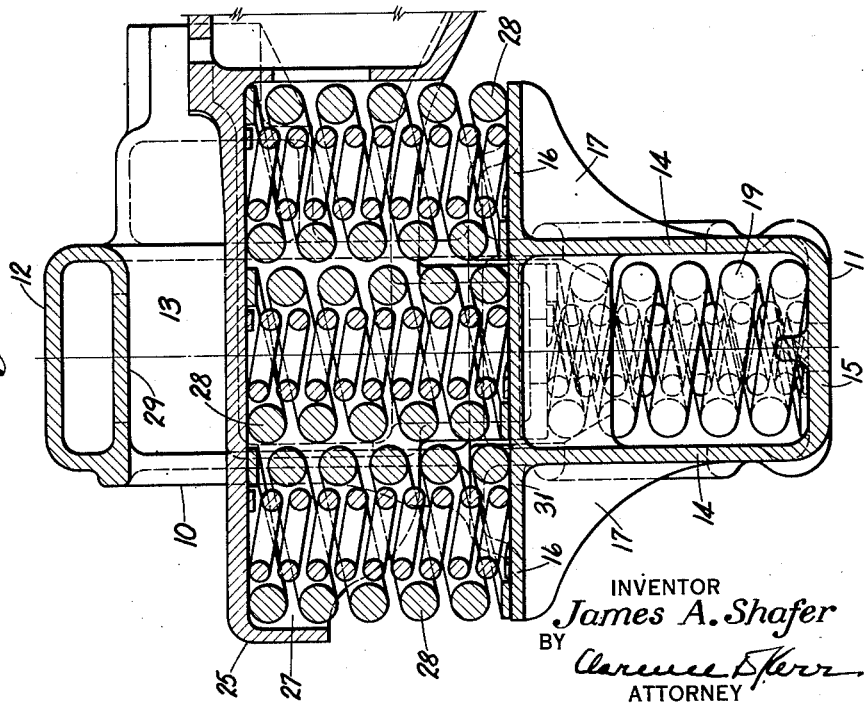
INVENTOR
James A. Shafer
BY
Clarence E. Kerr
ATTORNEY INVENTOR
James A. Shafer
BY
Clarence D Kerr
ATTORNEY Patented Apr. 11, 1939

2,153,649

UNITED STATES PATENT OFFICE 2,153,649

CAR TRUCK

James A. Shafer, East Cleveland, Ohio, assignor to National Malleable and Steel Castings Company, Cleveland, Ohio, a corporation of Ohio Application October 14, 1937, Serial No. 168,857

13 Claims. (Cl. 105—197)

This invention relates to car trucks and more particularly embodies certain improvements over the car trucks shown in my copending applications Serial No. 109,285, filed November 5, 1936, and Serial No. 153,884, filed July 16, 1937.

The trucks shown in the aforesaid applications are of the type having spring seats on the side frames at different levels, one above the other, the bolster being formed with downward projections extending through the upper spring seat and engaging the springs on the lower spring seat. Application Serial No. 109,285 discloses an advantageous truck construction of this type wherein, by the use of smaller diameter springs in the tension member of the side frame, the frame may be made narrower and the horizontal part thereof upon which said springs rest may be shortened, with consequent increase in the strength of this portion of the side frame. In this previous application assembly and disassembly of the side frames and bolster is made possible by the use of shorter springs on the upper spring seat so that the overall height of the ends of the bolster is such that the bolster can be inserted in the window opening formed by the compression member and upper spring seat of the side frame. In my application Serial No. 153,884 there is shown a truck that utilizes the same springs on the upper and lower shelves, assembly of the side frames and bolster being accomplished by means of loose pieces projecting upwardly through the top of the bolster so as to provide room for the longer upper springs. My present invention deals with an arrangement which retains the advantages of the truck shown in application Serial No. 109,285 without requiring shorter springs on the upper spring seat, and further without requiring the use of loose pieces in the bolster for the accommodation of longer springs.

In the accompanying drawings:

Figure 2 is a view similar to Fig. 1 showing a modification of the invention.

Figure 3 is a vertical sectional view on line 3—3 of Fig. 1.

Figure 4 is a vertical sectional view on line 4—4 of Fig. 2.

Figure 1:
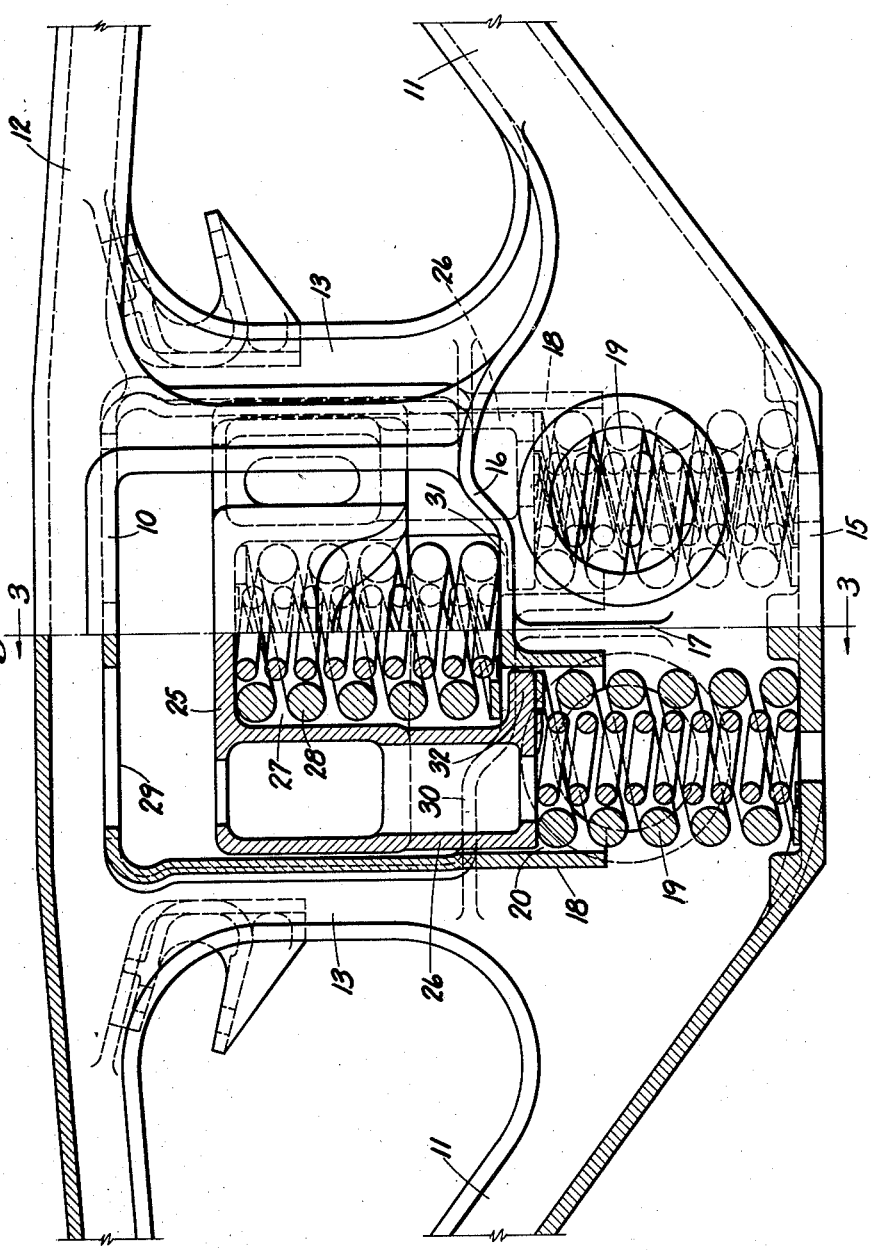
Figure 1 is a view partly in front elevation and partly in longitudinal section of a side frame and bolster embodying my invention.

Referring first to Figs. 1 and 3, the side frame 10 comprises tension member 11, compression member 12 and vertical connecting columns 13. The central portion of the tension member is of box-section, comprising side walls 14, bottom wall 15 and a top shelf 16 joining and projecting beyond the side walls and forming a spring seating portion. Reinforcing ribs 17 join the underside of shelf 16 with the side walls. In the box-section thus formed are sleeves 18 receiving lower springs 19 which are inserted through openings 20 in shelf 16, said openings being in line with the inner surfaces of sleeves 18. The bolster 25 has an end portion projecting into the window opening formed by the tension and compression members and columns which end portion has a pair of downwardly projecting lugs 26 extending into openings 20 and supported on the lower springs 19. Between the lugs 26 and extending longitudinally of the end portion of the bolster is a pocket 27 receiving upper bolster supporting springs 28 of the same diameter and length as the lower springs 19.

In assembling the side frame and the bolster, the former is slid over the end portion of the bolster until the lugs 26 are over the openings 20 in the side frame at which time the bolster may be lowered until it rests on springs 19. It will be observed that this truck retains another feature of my application Serial No. 109,285 in that the end of each lug 26 on the bolster is the same diameter as the spring it engages, thus obtaining a good bearing of the lug on the spring without requiring a washer to span the coil of the spring where the diameter of the latter is greater than that of the lug. It will at the same time be seen that the distance from the top of the bolster to the bottom of lugs 26 must be less than the distance from under surface 29 of the compression member and the upper surface 30 of shelf 16. Or stating it in another way, there must be sufficient clearance between the top of the bolster and surface 29 of the compression member to permit the bolster to be raised to a point where the bottom of lugs 26 will be above shelf 16. I have found that by depressing the center portion of shelf 16, as shown at 31, upper springs 28, of the same length as lower spring 19, can be positioned in pocket 27 so that they will rest at their bottom ends on portion 31 of shelf 16, with their upper ends bearing against the top wall of the bolster. At the same time, this construction permits assembly and disassembly of the side frame and bolster since the overlap between lugs 26 and sleeves 18 is less than the distance between the top of the bolster and surface 29 on the side frame. It will be seen from Fig. 1 that even with the shelf thus depressed there is sufficient room for projection 32 on each trunnion 26 to extend between the upper surface of spring 19 and the lower end of the middle spring 28 so that each of lugs 26 has a full bearing on the corresponding one of lower springs 19. It will also be observed that the ends of the shelf adjacent the columns and the portions of sleeves 18 nearest the columns afford a considerable overlap with the trunnions 26 to tie the side frames and bolster together. While in this form of the invention I have shown three springs in pocket 27 of the bolster, it will be apparent that only two springs may be used if desired. Furthermore, there are shown inner coils in each of springs 19 and 28. These may be omitted or used, as desired.

Figure 6:
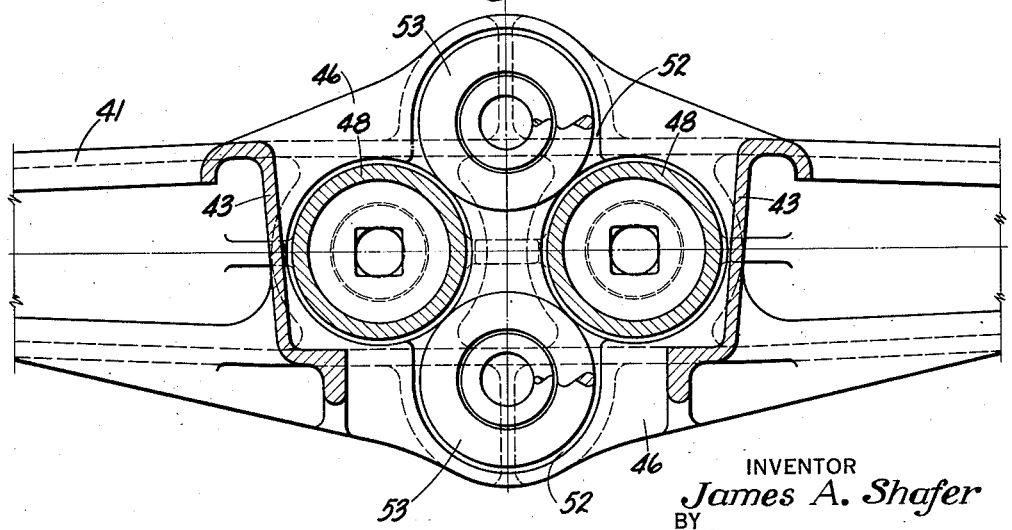
Figure 6 is a horizontal sectional view on line 6—6 of Fig. 2.

The form of the side frame and bolster shown in Figs. 2 and 4 is generally similar to the construction just described, the side frame 40 having tension member 41, compression member 42 and columns 43. Side walls 44 of the tension member are joined by bottom wall 45 and top wall or shelf 46. The bolster 47 is likewise formed with downwardly extending lugs 48 projecting into openings 49 in shelf 46 and into sleeves 50 formed in the tension member between side walls 44. Springs 51 are positioned between bottom wall 45 and the underside of lugs 48 to support the bolster. However, instead of depressing the entire central portion of shelf 46 as in the form previously described, I form a pair of pockets 52, most clearly shown in Figs. 4 and 6, which receive the bottoms of upper springs 53. The bottom wall 54 of the pocket is at such a level that the upper ends of springs 53 engage the top wall 55 of the bolster at substantially the same time that the trunnions 48 engage the tops of springs 51. In this case, as with the form described above, sufficient clearance is maintained between the top of the bolster and the underside of the compression member to allow the lugs to be completely withdrawn from sleeves 50 in disassembly of the truck. The upturned flanges 56 forming the end walls of pockets 52 assist in positioning the springs 53 on the shelf.

Figure 5:
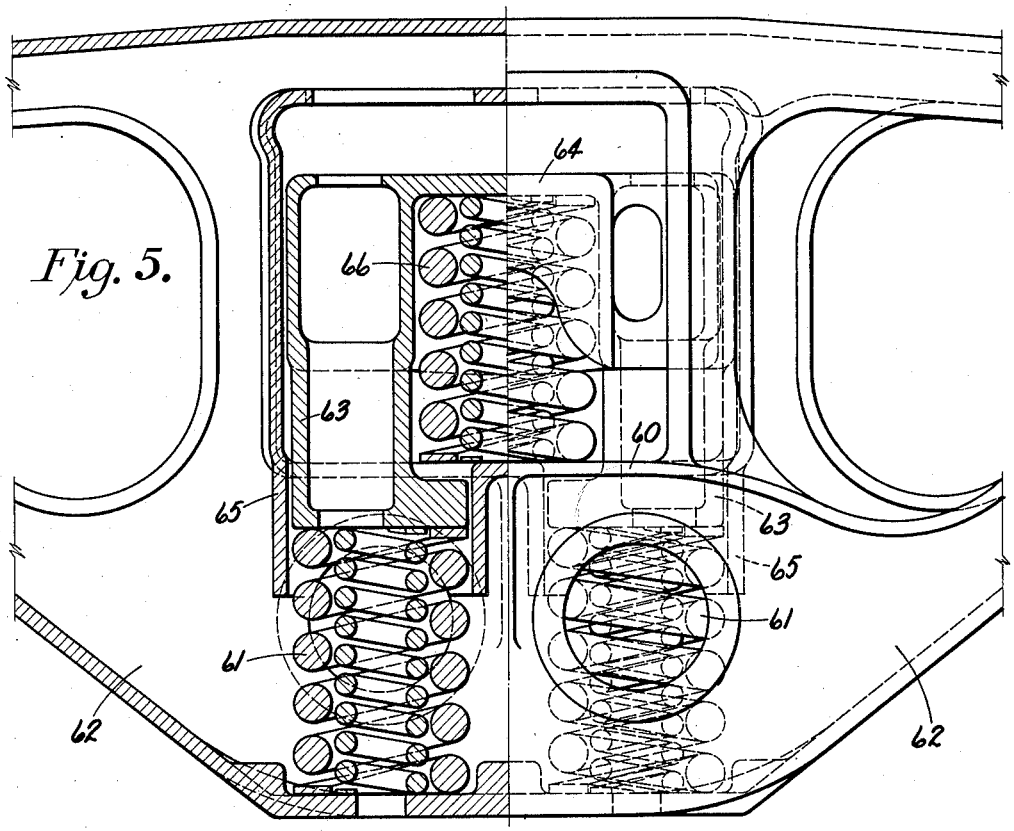
Figure 5 is a view similar to Fig. 1 but showing a still further modification of the invention.

In Fig. 5 there is shown another form of my invention in which shelf 60 is lowered over its entire extent, so that it is nearer the upper ends of lower springs 61 supported in the box-section of tension member 62. By thus lowering shelf 60 the overlap between lugs 63 on bolster 64 and sleeves 65 in the side frame is decreased by the amount of lowering shelf 60. It is therefore unnecessary to maintain as much clearance between the top of the bolster and the under surface of the compression member of the side frame to permit withdrawal of lugs 63 from sleeves 65, as in the previous forms of the invention. I have found therefore that the top wall of the bolster can be raised sufficiently to permit the use of the same height springs on the upper shelf as are used in the box-section of the tension member and still maintain sufficient clearance between the top of the bolster and compression member to assure assembly and disassembly of the truck. Upper springs 66 rest at their lower ends on shelf 60 and at their upper ends engage the top wall of the bolster.

It will be apparent that my present invention constitutes a distinct improvement of my aforesaid copending applications by permitting the use of standard springs of the same length and diameter on the top shelf of the side frame as are used in the box-section of the tension member. This is accomplished without the use of loose pieces and without in any way affecting the easy assembly and disassembly of the side frames and bolster.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car truck a bolster having a downwardly opening pocket therein, the top of said pocket being integral with said bolster, a side frame having a plurality of spring supporting portions one above the other, spring means on each of said portions for supporting said bolster, said bolster having an integral projection extending through an opening in said upper spring supporting portion for engaging the spring means on said lower spring supporting portion, and means depending from said upper spring supporting portion and surrounding said projection and spring means for positioning said bolster and spring means with respect to said side frame, said upper spring supporting portion being constructed and arranged so that the distance from the top thereof to the upper end of said pocket in the bolster is the same as the distance from the underside of said projection to said lower spring supporting portion.

2. In a car truck a bolster, a side frame having a plurality of spring supporting portions one above the other, spring means on each of said portions for supporting said bolster, said bolster having a pocket comprising a top wall integral with the bolster for receiving spring means on the upper spring supporting portion of the side frame and also having an integral projection extending through an opening in said upper spring supporting portion for engaging the spring means on said lower spring supporting portion, and means depending from said upper spring supporting portion and surrounding said projection and spring means for positioning said bolster and spring means with respect to said side frame, said spring means on said upper and lower spring supporting portions being of the same height and diameter.

3. In a car truck a bolster, a side frame having a tension member, a compression member above said bolster and having a shelf intermediate said tension and compression members, said shelf and tension member comprising spring supporting portions one above the other, spring means on each of said portions for supporting said bolster, said bolster having an integral projection extending through an opening in said shelf for engaging the spring means on said tension member and for tying said side frame and bolster together, means on said side frame for positioning the upper end of said lower spring means, said spring means on said upper and lower spring supporting portions being of the same height and said shelf being positioned so that when said bolster is assembled in said side frame the distance from each point on the top of said bolster directly below the compression member to the underside of said compression member is at least as great as the distance from the top of said lower spring means to the top of said shelf.

4. In a car truck a bolster, a side frame having tension and compression members and a shelf intermediate said members, spring means on said tension member and shelf, said bolster having a projection extending through an opening in said shelf and into engagement with the spring means on said tension member, said shelf being depressed at its center portion to form the spring supporting portion for the spring means on said shelf.

5. In a car truck a bolster, a side frame having tension and compression members and a shelf intermediate said members, spring means on said tension member and shelf, said bolster having a projection extending through an opening in said shelf and into engagement with the spring means on said tension member, said shelf being depressed at its center portion to form a spring seat in the center portion thereof at a lower level than the remainder of said shelf.

6. In a car truck a bolster, a side frame having tension and compression members and a shelf intermediate said members, said shelf having a plurality of pockets at the center thereof positioned at a lower level than the remainder of said shelf, spring means in said pockets and extending upwardly into said bolster, other spring means on said tension member below said first-named spring means, and means on said bolster projecting downwardly through an opening in said shelf and into engagement with said lower spring means.

7. In a car truck a bolster, a side frame having tension and compression members and a shelf intermediate said members, said shelf having a plurality of pockets at the center thereof positioned at a lower level than the remainder of said shelf, spring means in said pockets and extending upwardly into said bolster, other spring means on said tension member below said first-named spring means, and means on said bolster projecting downwardly through an opening in said shelf and into engagement with said lower spring means, said upper and lower spring means being of the same height and diameter.

8. In a car truck a bolster, a side frame having a tension and compression member and columns joining said members, a shelf intermediate said members and forming a spring seat, spring means on said tension member and seat, said bolster having a projection extending through an opening in said shelf and into engagement with the spring means on said tension member, said shelf adjacent said columns having means thereon at a higher level than said spring seat and overlapping said projection to a greater extent than said shelf in the region of said spring seat.

9. In a car truck a bolster, a side frame having a tension member, a compression member above said bolster and a shelf intermediate said tension and compression members, said shelf and tension member comprising spring supporting portions one above the other, spring means on each of said portions for supporting said bolster, said bolster having a projection extending through an opening in said shelf for engaging the spring means on said tension member and for tying said side frame and bolster together, said projection being of no greater diameter than said opening, said spring means on said upper and lower spring supporting portions being of the same height and said spring means in said tension member being of such diameter as to substantially fill said member transversely of the side frame, said shelf being positioned so that when said bolster is assembled in said side frame the distance from each point on the top of said bolster directly below the compression member to the underside of said compression member is at least as great as the distance from the top of said lower spring means to the top of said shelf.

10. In a car truck, a bolster having an integral spring receiving pocket, a side frame comprising tension and compression members and connecting columns, a portion of said tension member being of box section and forming a plurality of spring seating portions one above the other, spring means of the same height on each of said portions for supporting said bolster, said spring means on said lower portion being of such diameter as to extend substantially the width of said box section, said bolster having a pair of projections extending through openings in said upper spring seating portion, said projections each having a spring seating portion of at least the same diameter as said lower springs, and said upper spring seating portion of said side frame being so constructed and arranged that the distance from the top thereof to the upper end of said integral pocket is the same as the distance from the under side of said bolster projections to said lower spring seating portion.

11. In a car truck, a bolster having an integral spring receiving pocket, a side frame comprising tension and compression members and spaced connecting columns forming a window opening therewith, a hollow spring seating portion on said side frame beneath said window forming upper and lower spring seats, spring means of the same height on said seats said upper spring means extending into said bolster pocket, means on said side frame for positioning the upper end of the spring means on said lower seat and integral means on said bolster extending into said spring seating portion and engaging said lower spring means, said spring seating portion being so constructed and arranged that said seats are positioned entirely within the distance between said columns and so that the distance from said upper spring seats to the upper end of said integral pocket is the same as the distance from the bottom of said lower spring engaging means on said bolster to said lower spring seats.

12. In a car truck, a bolster having an integral spring receiving pocket, a side frame comprising tension and compression members and spaced connecting columns forming a window opening therewith, said tension member comprising a hollow central portion and upwardly and outwardly sloping end portions, the junctures of said end and central portions being spaced apart no greater than the distance between said columns, spring means in said central portion seated between the points of juncture of said central and end portions, other spring means in said window opening and extending into said bolster pocket, all of said spring means being the same height, means on said side frame for positioning the upper end of the spring means in said central portion and integral means on said bolster engaging said lower springs, said hollow central portion being so constructed and arranged that the distance from the bottom of said window to the upper end of said integral pocket is the same as the distance from the bottom of said lower spring engaging means on said bolster to the seat for said lower spring means.

13. In a car truck, a side frame comprising tension and compression members and connecting columns forming a bolster receiving window, a bolster projecting into said window and having an integral spring receiving pocket, a shelf below said window, spring means on said shelf extending into said pocket, said tension member having a spring housing below said shelf, spring means in said housing of the same height as said first-named spring means, said last-named spring means being of such diameter as to substantially fill said housing transversely of said side frame, said shelf having openings therein of such size as to permit insertion of said spring means therethrough into said housing, and a plurality of projections on said bolster extending through said openings and engaging said lower spring means, said shelf being so constructed and arranged that the distance from the spring seating portion thereof to the upper end of said integral pocket is the same as the distance from the bottom of said projections to the spring seats in said housing.

JAMES A. SHAFER.